United States Patent [19]
Leith

[11] 4,118,106
[45] Oct. 3, 1978

[54] FIBER OPTIC PHASE CORRECTION USING HOLOGRAMS

[75] Inventor: Emmett N. Leith, Plymouth, Mich.

[73] Assignee: Environmental Research Institute of Michigan, Ann Arbor, Mich.

[21] Appl. No.: 710,581

[22] Filed: Aug. 2, 1976

[51] Int. Cl.$^2$ .............................................. G02B 5/14
[52] U.S. Cl. ................................ 350/96.25; 350/3.82; 350/96.30; 350/162 SF
[58] Field of Search .......... 350/96 BC, 96 C, 96 WG, 350/3.5, 162 SF, 96.25, 96.30, 3.82

[56] References Cited

U.S. PATENT DOCUMENTS

| | | | |
|---|---|---|---|
| 3,435,244 | 3/1969 | Burckhardt et al. ............. | 350/3.5 X |
| 3,759,590 | 9/1973 | Arnaud ........................... | 350/96 WG |
| 3,832,030 | 8/1974 | Gloge ............................. | 350/96 C X |
| 3,872,293 | 3/1975 | Green ............................. | 350/162 SF X |
| 3,980,391 | 9/1976 | Stewart .......................... | 350/96 C |

OTHER PUBLICATIONS

Krusos, "Restoration . . . by Optical Spatial Filtering," *Optical Engineering*, vol. 13, No. 3, May/Jun. 1974, pp. 208–218.
Alferness, "Phase Correction in . . . ," *Optics Communications*, vol. 12, No. 2, Oct. 1974, pp. 152–155.

*Primary Examiner*—John K. Corbin
*Assistant Examiner*—John D. Lee
*Attorney, Agent, or Firm*—Krass & Young

[57] ABSTRACT

An arrangement for correcting the phase redistribution of a wave occurring in transmission through fiber optics is disclosed. The phase redistribution occurring as a result of the differences in length between the individual optical fibers is corrected by means of a hologram used as a corrector plate positioned in contact with the exit face of the bundle, with this hologram being produced by combining a reference beam with the output wave produced from an input plane wave. The phase redistribution occurring within individual fibers introduced by transmission of an incident object field exciting differing modes is corrected by the use of a second holographic correction plate placed at a plane which displays the Fourier transform of the output field at the output of the fiber bundle. This hologram is produced by an input wave form which excites each of the various modes in the fibers and passing the output transmitted through the fiber optic through a lens and recording the hologram at the back focal plane. This second corrector plate is disclosed as allowing resolution of an input image better than the fiber size.

5 Claims, 5 Drawing Figures

FIBER OPTIC PHASE CORRECTION USING HOLOGRAMS

BRIEF DESCRIPTION OF THE PRIOR ART

1. Field of the Invention

This invention concerns fiber optics and more particularly the correction of phase redistribution of input waves occurring in transmission through fiber optic elements in bundles.

2. Description of the Prior Art

Fiber optic bundles have the property that an intensity distribution on one end thereof is transmitted to the other end. It has been appreciated in the past, however, that while the intensity (amplitude) of an input wave is transmitted, there occurs a phase redistribution of an input wave in being transmitted from the input to the output. This phase redistribution limits the application of a fiber optic to those in which a phase distribution need not be preserved, i.e., imaging of an object image at the input end, that is, if an object is positioned away from the input end, the phase redistribution prevents transmission of the image unless a lens system is used to focus the image of the object onto the input face of the fiber bundle. Such a lens system cannot be used in many applications such as nuclear core cameras because of space limitations. In addition, in any optical process or application in which the phase of the input or object waves must be preserved, such as interferometry or holography, the use of fiber optics has not been possible. The resolutions obtainable by these transmission characteristics of the fiber optic bundle have also for this reason been limited by the size of the individual fiber optic and three-dimensional imagery has likewise not been possible.

This phase redistribution occurring in transmission results partly because of differences in lengths of the individual fibers in the bundle, the resulting differences in distances of the optical path traversed by the respective portion of the object field transmitted by the bundle introducing a phase delay between fibers. Secondly, the method of transmission of an input wave through an individual fiber may be by a number of different modes, the number depending on the cross-sectional dimension of the fiber and the angle of incidence of the input wave.

The first of these causal factors in phase redistribution has heretofore been recognized and a successful solution suggested in U.S. Pat. No. 3,435,244. This solution involves the use of a hologram as a corrector plate implaced at the output end of the fiber bundle. This hologram is made by combining a reference beam and the output from the fiber bundle obtained from an input wave at normal incidence. Fiber optic bundles utilizing such a corrector plate have been found to be free of random phase shifts resulting from differences in lengths of the individual fibers in the bundle. There has not however, prior to the invention which is the subject of the present application been a solution developed for the phase delays introduced by the existence of different modes of propagation through individual fibers.

Accordingly, it is an object of the present invention to provide a means for completely preserving the phase distribution of an input object wave field transmitted through a fiber optic bundle.

It is another object of the present invention to provide a correction for phase differences between differing modes of propagation within individual fibers.

SUMMARY OF THE INVENTION

These and other objects which will become apparent upon a reading of the following specification and claims is accomplished by the use of a hologram positioned in contact with the output face of the bundle as a corrector plate for phase redistribution in a fiber optic bundle occurring as a result of length variations among individual fibers.

This first correction means is combined with a second corrector plate consisting of a hologram formed by directing into the input of the fiber optic bundle a waveform which excites each of the various modes of the fibers and passing the output of the fiber bundle through a lens and recording a hologram at the back focal plane thereof. This hologram is then positioned within a plane which displays the Fourier transform field at the output of the fiber bundle, these corrections thus allowing transmission through the system of any image formed in monochromatic light of the same wave length used in making the corrector holograms, this corrected output field forming a three-dimensional image of the original object distribution at the other end of the fiber bundle.

DETAILED DESCRIPTION

In the following specification and drawings certain specific terminology will be utilized and particular embodiments described in accordance with 35 USC 112 but it is to be understood that the invention is not so limited to the particular embodiment described but is susceptible of a wide variety of applications within the scope of the invention.

In explaining the effects of random length variations between the individual fibers, the following analysis of the imaging process of the fiber optic bundle may be useful.

Let a field $u_{IN}$ fall on one face. We assume that each constituent fiber transmits its received portion of $u_{IN}$ to the other end, thus producing the output $u_{OUT}$. Let the $j$th fiber introduce a phase delay $\psi_j$. Then:

$$u_{OUT} = u_{IN} e^{i\psi_j}$$

All fibers introduce approximately the same delay, but not exactly. Let the average phase delay be $\psi_{jo}$, and the deviation from this be $\Delta\psi$. Thus:

$$\psi_j = \psi_{jo} + \Delta\psi$$

Suppose $\Delta\psi$ has a random distribution over at least several $\pi$ radians or more. The wavefront $u_{OUT}$ thus is like the input distribution, multiplied by a random phase. Thus, the plate acts like a piece of ground glass.

If an object is projected onto one face, the intensity distribution is:

$$I_{IN} = |u_{IN}|^2,$$

the output intensity is:

$$I_{OUT} = |u_{OUT} e^{i\psi_j}|^2$$
$$= |u_{OUT}|^2 = |u_{IN}|^2 = I_{IN},$$

and the image is thus conducted across the fiber bundle. The initial phase distribution, however, is lost.

Figure 1:
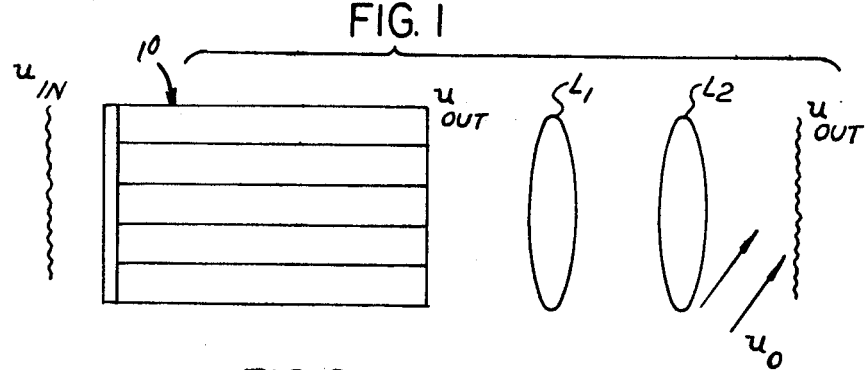
FIG. 1 is a diagrammatic representation of an optical arrangement for producing a hologram suitable for use as a corrector plate for compensating for phase errors introduced as a result of variations in lengths of the individual fibers within an optical fiber bundle.

This phase redistribution can be compensated for by means of a hologram prepared as depicted in FIG. 1. A plane wave $u_{IN}$ is directed at the input end of the bundle 10 impinging thereon at normal incidence. The emerging wave $u_{OUT}$ is reimaged by means of a pair of lenses $L_1$ and $L_2$ so as to be combined with a reference wave $u_O$, as shown, with the resulting hologram being utilized as a corrector plate when placed in contact with the exit face of the bundle. An input wave $u_{IN}$ will then be transmitted through the fiber bundle 10 structure without phase distortion as a result of the random phase variation introduced by the differences in lengths of the individual fibers and the original object field can then be imaged free from the effects thereof. This correction or compensation for phase shifts has been previously described in U.S. Pat. No. 3,435,244 and does not comprise per se the present invention. The concept of the present invention comprises a compensation scheme for the phase redistribution occurring as the result of the multi-modal propagation of the wave through the individual fibers as described above, both above and in combination with the above described corrector plate.

The need for such a second corrector plate arises since internally reflecting light conducting elements such as fiber optic elements may conduct light in discrete modes. Typically, a fiber will simultaneously support dozens of modes, each having a different propagation constant, thus introducing a different phase delay on the propagating field. Thus, the phase delay $e^{i\psi_j}$ would be the average produced by many modes. Now the phase delay $e^{i\psi_j}$ will thus be affected by which modes are excited, and the distribution of incident light among these modes. In turn, this excitation distribution will depend on the particular field distribution $u_{IN}$ across a given fiber. If the field in the vicinity of the fiber is approximately a plane wave at normal incidence, predominantly lower modes will be excited; if it is a plane wave at oblique incidence, higher order modes will be excited. Thus, $e^{i\psi_j}$ would be signal dependent, and the first corrector plate described above would not function properly.

The phase redistribution occurring because of the above modal phase redistribution is corrected according to the present invention by the use of a second correction plate based on the following analysis:

Suppose the system shown in FIG. 1 consists of an array of fibers, each having a slightly different optical length, and each conducting in a large number of modes, each mode being excited by a specific incident angle of light. Let a field $u_{IN}(x)$ be incident. This may be expressed as the Fourier decomposition $U(f_x,f_y)$. Let the phase delay as a function of position (i.e., the phase delay of different fibers) be $h_1(x,y)$ and the phase delay as a function of mode (i.e., spatial frequency) be $H_2(f_x,f_y)$. Thus the wave emerging from the fiber bundle is:

$$u_{OUT} = h_1 [h_2 * u_{IN}]$$

where $*$ denotes convolution, and $h_2$ is the Fourier transform of $H_2$.

Figure 2:
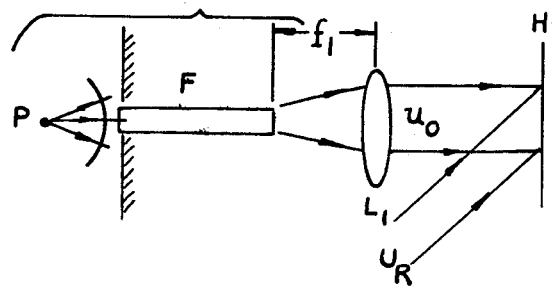
FIG. 2 is a diagrammatic representation of an optical arrangement for generating a correction plate for compensating for modal-induced phase redistributions occurring by virtue of transmission of waves within individual optical fibers.

This second corrector plate would be prepared by the following method depicted diagrammatically in FIG. 2.

With the correction hologram prepared according to the method outlined above in place, we use its conjugate image and excite the array of fibers F (or equally well, a single fiber) in a multi-mode manner as by a point image P. Ideally, all possible modes should be excited as uniformly as possible. A second hologram H is then formed by a lens $L_1$ having a focal length $f_1$ at a plane which is Fourier transform related to $u_{OUT}$.

Figure 3:
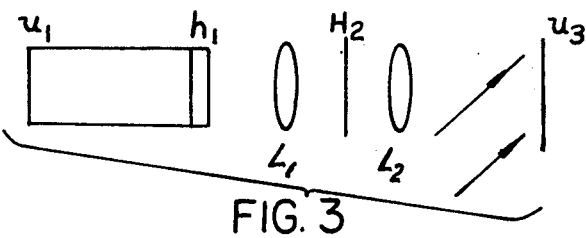
FIG. 3 is a diagrammatic representation of an optical system showing a fiber optic correction arrangement with both corrector plates produced by the arrangements depicted in FIGS. 1 and 2 in position with respect to the fiber optic bundle together with a means for forming the image of the original object distribution.

The use of the corrector plates is as depicted in FIG. 3 and involves positioning both holograms $h_1$ and $H_2$ in place and using a conjugate image by the use of each lens $L_1$ and $L_2$ to obtain the output field $u_3$, which would precisely correspond to the input field $u_1$. If $u_3$ is recorded as a hologram, a three-dimensional image should be able to be formed therefrom and alternatively the field $u_3$ should form a three-dimensional image with the original object as to distribution that produced $u_1$.

Figure 4:
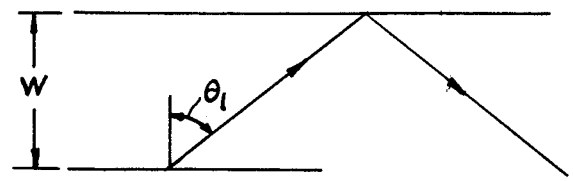
FIG. 4 is a diagrammatic representation of the mode structure of a guiding slab.

It can be shown by the following analysis that the resolution obtained when the phase corrections are implemented according to the method described above is finer than the fiber size:

The mode structure of a guiding slab of thickness W is given approximately by FIG. 4:

$$(2/\lambda)N_1 W \cos\theta_1 = m$$

where
$\lambda$ = free space wavelength of radiation
$n_1$ = refractive index of fiber
$\theta_1$ = angle of propagation
$m$ = mode number
Example: for $\lambda = 0.0005$ mm, W = 0.01 mm, n = 1.5, we have

| m | $\theta_1$ |
|---|---|
| 1 | 89.0° |
| 2 | 88.1° |
| 3 | 87.1° |
| 5 | 85.2° |
| 10 | 80.4° |
| 20 | 70.5° |
| 30 | 60.0° |

Figure 5:
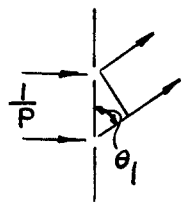
FIG. 5 is a diagrammatic representation of the diffraction of a coherent collimated nominally incident light beam.

Consider the spatial frequency components of the object, and the direction in which they diffract a coherent, collimated, normally incident light beam (FIG. 5) where $$(\cos\theta'_1/\lambda) = P$$

If $1/p = W$, the diameter of the fiber, then the previous equations may be rewritten in the form:

$$\cos\theta_1 = (m/n_1 W)$$

$$\cos \theta_1' = \lambda/W$$

If a wavefront being coherently preserved at the fiber bundle output is considered, the resolution obtainable from this wavefront depends on how well the various spatial frequency components of the incident field can be resolved. If the film is excited only on the fundamental mode, this will ensure resolution of the size of the individual fibers. If three modes are transmitted, and the phase of the light travelling through these modes is preserved, it is apparent that there are three frequency samples between $0 < p < 2/W$. This ensures resolution of detail of the fineness of $W/w$, or two resolution elements across each fiber.

Hence, by this correction process, the fiber bundle can resolve better than the size of a single fiber, and the higher the order of modes that are transmitted and corrected for, the better is the resolution. The ultimate limitation is the acceptance angle of light which is captured and properly preserved. Thus, the resolution is given by the same criterion as in conventional optical systems.

It can be appreciated by one of ordinary skill in the art that the usefulness of fiber optic bundles is greatly enhanced by these corrector plates, i.e., high resolution three dimensional imaging of objects displaced from the input end is possible without the use of lenses to image the object at the bundle input face. Also, phase-critical optical processes such as the formation of a hologram of an object image therethrough and interferometry may be practiced on the transmitted wave.

The embodiments of the invention in which an exclusive property or privilege is claimed are defined as follows:

1. A phase corrected fiber optic bundle comprising:
    a fiber optic bundle having an input face and an output face;
    a fiber length holographic phase corrector plate positioned at said output face of said fiber optic bundle, said corrector plate consisting of a hologram produced by a recording of the interference pattern between a reference wave with the output from said fiber optic bundle produced by a plane wave input thereto;
    a modal holographic phase corrector plate placed at a plane which displays the Fourier transform of a field at the output of said fiber optic bundle, said modal corrector plate comprised of a hologram formed with said fiber length corrector plate in place and consisting of a recording of the interference pattern between the Fourier transform of the output field generated by an input waveform which excites multi-modal propagation through said fiber optic bundle, and a reference wave, at a plane displaying said Fourier transform.

2. A method of correcting the phase redistribution occurring in a light wave transmitted by a plurality of modes through an internally reflecting light conducting element comprising:
    preparing a hologram of the interference pattern between a reference wave and a Fourier transform of an output wave generated by an input wave transmitted through said light conducting element, said input wave being of a waveform so as to be propagated therethrough in a plurality of modes;
    placing said hologram in a place which displays the Fourier transform of a field at the output of said light conducting element.

3. The method according to claim 2 wherein in said hologram preparing step said Fourier transform of said output wave is produced by passing said output wave through a lens and recording said hologram at the back focal plane thereof.

4. A method of transmitting an object field through internally reflecting light conductor having an input face and an output face comprising the steps of:
    transmitting an object field through said input face of said light conductor;
    positioning a modal holographic phase correction plate at a plane which displays the Fourier transform of the field at the output of the light conductor, said modal holographic phase correction plate comprising a hologram consisting of a recording of the interference pattern between the Fourier transform of the output field generated by an input wave form exciting multi-modal propagation through said light conductor and a reference wave at a plane displaying said Fourier transform;
    imaging said output field at said modal holographic phase correction plate whereby the object field is reproduced without phase redistribution occurring as the result of modal phase redistribution.

5. The method of transmitting an object field through a fiber optic bundle having an input face and an output face including the steps of:
    transmitting said object field through said input face of said fiber optic bundle;
    positioning a fiber length holographic phase correction plate at said output face of said fiber optic bundle, said fiber length holographic correction plate consisting of a hologram produced by a recording of the interference pattern between a reference wave with the output from said fiber optic bundle produced by a plane wave input thereto;
    positioning a modal holographic phase correction plate at a plane displaying the Fourier transform of the object field transmitted through said fiber length holographic phase correction plate, said modal holographic phase correction plate consisting of a hologram formed with said fiber length corrector plate in place and consisting of a recording of the interference pattern between the Fourier transform of the output field generated by an input wave form exciting multi-modal propagation through said fiber optic bundle and a reference wave at a plane displaying said Fourier transform;
    imaging the field transmitted through said modal holographic phase correction plate whereby said object field may be transmitted through said fiber optic bundle without phase redistribution.

* * * * *